US008413008B2

(12) United States Patent
Liva et al.

(10) Patent No.: US 8,413,008 B2
(45) Date of Patent: Apr. 2, 2013

(54) METHOD FOR RECOVERY OF LOST AND/OR CORRUPTED DATA

(75) Inventors: Gianluigi Liva, Munich (DE); Balázs Matuz, Gilching (DE)

(73) Assignee: Deutsches Zentrum Fuer Luft-und Raumfahrt E.V., Cologne (DE)

( * ) Notice: Subject to any disclaimer, the term of this patent is extended or adjusted under 35 U.S.C. 154(b) by 964 days.

(21) Appl. No.: 12/386,486

(22) Filed: Apr. 17, 2009

(65) Prior Publication Data

US 2009/0292966 A1 Nov. 26, 2009

(30) Foreign Application Priority Data

May 23, 2008 (EP) .................................. 08156794

(51) Int. Cl.
*H03M 13/00* (2006.01)
(52) U.S. Cl. .......................... 714/755; 714/786
(58) Field of Classification Search .................. 714/755, 714/786

See application file for complete search history.

(56) References Cited

U.S. PATENT DOCUMENTS

| 7,216,267 | B2 | 5/2007 | Santraine et al. | 714/709 |
|---|---|---|---|---|
| 2003/0012315 | A1 | 1/2003 | Fan | 375/349 |
| 2004/0221223 | A1* | 11/2004 | Yu et al. | 714/800 |
| 2005/0268202 | A1* | 12/2005 | Molisch et al. | 714/752 |
| 2008/0077843 | A1* | 3/2008 | Cho et al. | 714/801 |
| 2009/0106625 | A1* | 4/2009 | Jun et al. | 714/758 |

FOREIGN PATENT DOCUMENTS

| DE | 102006028947 A1 | 12/2007 |
|---|---|---|
| WO | WO2007/068554 A1 | 6/2007 |

OTHER PUBLICATIONS

Paolini, et al., "Low-Complexity LDPC Codes with Near-Optimum Performance over the BEC," Information Theory, Italy, Apr. 18, 2008; pp. 1-9.

* cited by examiner

*Primary Examiner* — Guy Lamarre
(74) *Attorney, Agent, or Firm* — Ohlandt, Greeley, Ruggiero & Perle, LLP

(57) ABSTRACT

A method for recovery of lost and/or corrupted data transmitted from a transmitter device to a receiver device. The data is coded by an encoder connected to the transmitter device. The data is transmitted from the transmitter device to the receiver device via a transmission system and is decoded by means of a decoder connected to the receiver device. This is performed through application of a low density parity check method, wherein lost and/or corrupted data is restored during decoding. The decoding is performed by solving the equation system of the parity check matrix H. The parity check matrix H is brought into a triangular form by column and/or row permutations. Columns of a sub-matrix B of the matrix H which impede the triangulation process are shifted into a sub-matrix P of the matrix H so that the triangulation process can be continued until the matrix H except for the sub-matrix P has been completely brought into a triangular form. The Gaussian elimination method is applied to a part of the sub-matrix P. The selection of the column or columns of the sub-matrix B which are to be shifted into the sub-matrix P is performed on the basis of the weight of the column which corresponds to the number of non-zero-entries in the column, and/or on the basis of the weight of the rows of the sub-matrix B connected to the column.

18 Claims, 7 Drawing Sheets

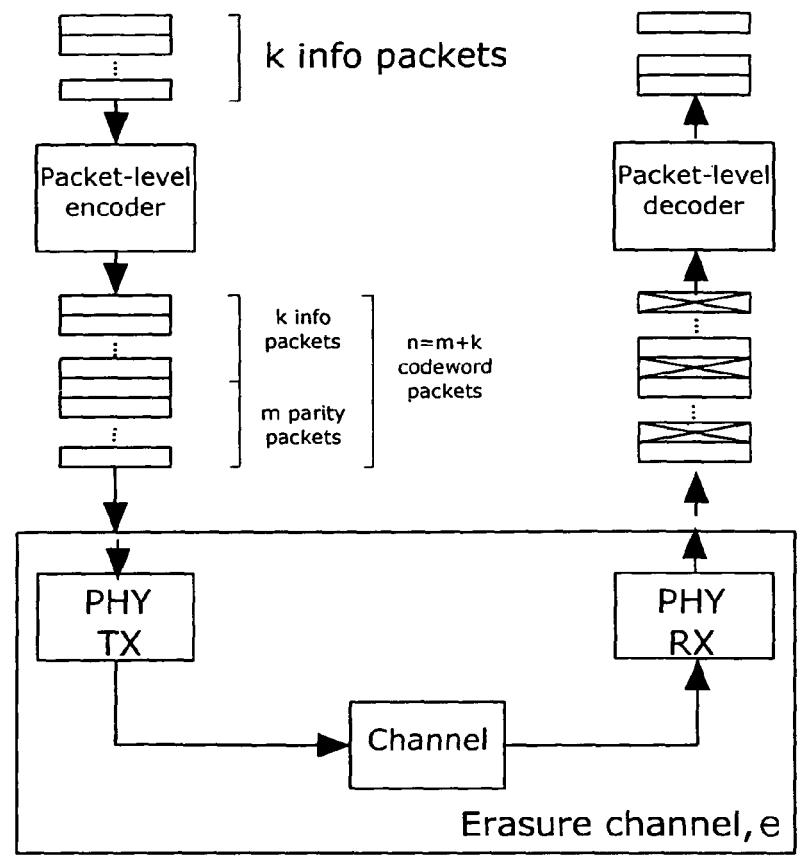
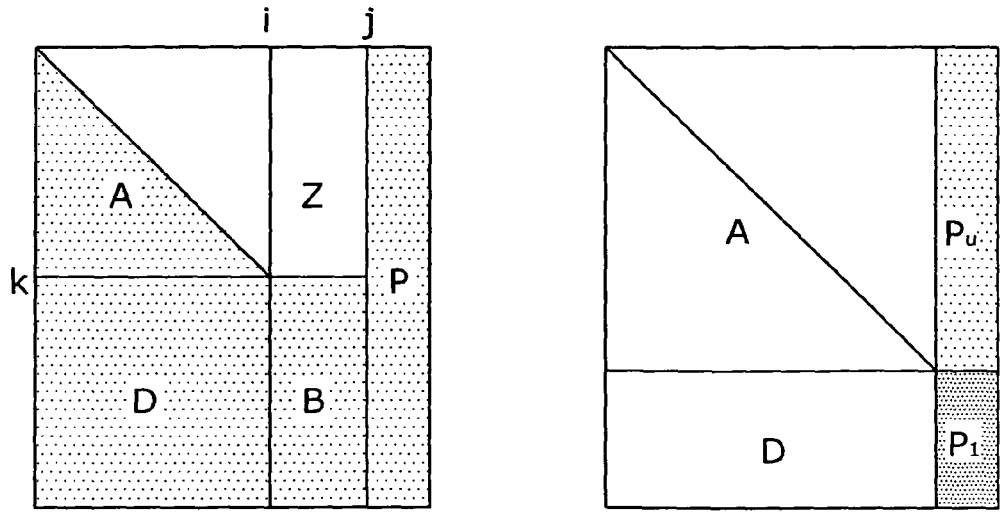
Fig.2

METHOD FOR RECOVERY OF LOST AND/OR CORRUPTED DATA

BACKGROUND

1. Field of the Disclosure

The present invention relates to a method for recovery of lost and/or corrupted data which is transmitted from a transmitter device to a receiver device.

2. Discussion of the Background Art

The transmitted data can be audio or video streams, for instance. From a transmitter device which makes these data available, the data is transmitted e.g. to a mobile receiver device. The mobile receiver device can be, for instance, a mobile phone, a PDA or another mobile end device. Alternatively, data can also be transmitted from a transmitter device to a stationary receiver device.

Examples of standards used for the transmission of data to mobile end devices include DVB-H, MBMS and, to be expected in the near future, DVB-SH.

In order to guarantee a good transmission quality, it is required to verify the correct transmission of data or data packets to the receiver device. Various methods exist for recovery of lost and/or corrupted data which were not correctly transmitted to the receiver device.

A known method for recovery of lost and/or corrupted data is the Low Density Parity Check (LDPC) method or the Low Density Parity Check Code. This method is applied on a so-called erasure channel. Apart from an application by coding on the level of the physical layer, further applications exist in the field of a Packet Erasure Channel (PEC).

FIG. 1 schematically illustrates an example of the recovery of lost and/or corrupted data according to the state of the art. FIG. 1 depicts a case where it is desired to transmit a number k of information packets from a transmitter device (left-hand side) to a receiver device (right-hand side). Using a packet-level encoder on the transmitter side, the k information packets and the m parity packets will be assembled into n=m+k codeword packets. On the level of the physical layer, the packets are secured by an error correction code (e.g. a turbo code) and an error detection code (e.g. by a Cyclic Redundancy Check, CRC) so that corrupted packets can be removed. On the levels above the physical layer, packets are either correctly received or are considered lost in that they are erased because the CRC has detected a corrupted packet in the physical layer. Thus, from the layers thereabove, the transmission channel is seen as a so-called erasure channel, the packets representing the transmission units. On the receiver side, the received codeword packets are decoded by the packet-level decoder so that the lost and/or corrupted data can be recovered.

The recovery of lost and/or corrupted data can be realized by a redundancy of the data. The encoding process handled by the packet-level encoder is usually performed in a bit-wise (or byte-wise) manner using an encoder with a Generic Binary Linear Block Code. The decoding will subsequently be performed by solving the equation system which is defined by the parity-check matrix H of the code. With increased block lengths, decoders of this type which are based on Gaussian elimination will be of a massively increased complexity so that high data rates can often not be reached.

In principle, the use of a Low Density Parity Check Code as a linear block code will offer two major advantages: The used maximum-likelihood decoder (or the Gaussian elimination) can be replaced by an iterative decoder. This imposes an upper limit on the ability to recover lost and/or corrupted data. Further, for LDPC codes it is possible to simplify the maximum-likelihood decoder by exploiting the sparseness of the parity check matrix.

A reduction of the complexity of the maximum-likelihood decoder does lead to an improved performance but is still relatively complex when compared to the iterative method. Illustrated in FIG. 13 is the performance of a Low Density Parity Check Code with n=1024 and k=512. This Figure shows the development of the Codeword Error Rate (CER), i.e. the decoding errors, when using a maximum-likelihood decoder and an iterative decoder in dependence on the erasure channel probability $\epsilon$. As a reference curve, the lower bound according to Singleton is represented. The performance of the maximum-likelihood decoder approaches this theoretical limit.

Of considerable importance in a mobile broadcasting application is the capability of packet-level codes to cope with signal fades and outages to the effect that most of the lost and/or corrupted data packets can be restored without a retransmission request. Preferably, use is made of software-implemented packet-level decoders since these do not need a high expenditure for implementation, are easily and flexibly updated and can be adapted by use of terminals which do not need a specific hard-ware design for this purpose. The methods known to date suffer from the disadvantage that either, when using the iterative decoder, it is possible to apply a fast and efficient working decoding method which, however, will yield only poor recovery results, or, when using the maximum-likelihood decoder, the applied method will yield improved recovery results but will have a high complexity and, depending on the given case, a restricted flexibility.

It is an object of the invention to provide a method for recovery of lost and/or corrupted data which are transmitted from a transmitter device to a receiver device, wherein said method shall allow for a better and/or less complex recovery of data.

SUMMARY OF THE DISCLOSURE

In a method for recovery of lost and/or corrupted data which are transmitted from a transmitter device to a receiver device, the data is first coded by an encoder connected to the transmitter device. Said encoder can be e.g. a packet-level encoder. The data is transmitted by the transmitter device via a transmission device to the receiver device. A transmitter device as defined in the context of the present invention is any device which is suitable for transmission of data from the transmitter device to the receiver device and/or vice versa. For instance, the transmitter device can be provided by using a mobile broadcasting system (e.g. DVB-H or MBMS). Further, the transmission of data can be carried by UMTS, for instance.

By use of a decoder connected to the receiver device, the transmitted data is decoded through a Low Density Parity Check method wherein, during decoding, lost and/or corrupted data is recovered.

Decoding is effected by solving the equation system of the parity check matrix H. Here, the parity check matrix H is made to take a triangular form by exchanging columns and/or lines. Columns of a sub-matrix B of the matrix H that hinder the triangularization process are shifted into a sub-matrix P of the matrix H so that the triangularization process can be continued until the matrix H, except for the sub-matrix P, has fully been given a triangular form. Gaussian elimination is applied to a part P1 of the sub-matrix P. According to the invention, the choice of the column or the columns of the sub-matrix B shifted into the sub-matrix P is based on the weight of the column or the weight of the lines of the sub-matrix B connected to the column. The weight of a column is defined as the number of non-zero digits in the column. The same is true for the weight of a line.

In order to solve the equation system of the parity check matrix H, the same is divided into a plurality of sub-matrixes. This is illustrated in FIG. 2. The main elements of the matrix are A, representing the part which is triangular in form, and B, representing the part that has to be given a triangular form. Initially, D is a sparse matrix which is eventually zeroed out, however. Z only comprises zeroes. P denotes the sub-matrix into which the columns of the sub-matrix are shifted that hinder the triangularization process.

Generally, an iterative decoder is used in the beginning of the method of the invention to solve the linear equation system. As will be described in the further course of the present application, the use of an iterative decoder is sufficient in most cases to recover corrupted or lost data. Iterative decoding is based on the so-called Message Passing (MP) Algorithm wherein no summing of lines is performed so that it requires no great computational effort. In a further decoding step, a maximum likelihood decoder is used, with this decoding step being performed only if the data can not be recovered in a sufficient manner by the iterative decoder. Details of this so-called hybrid decoder will be explained in the subsequent parts of the present application. First, however, it will be described how the process of maximum likelihood decoding, and especially the triangularization process, can be improved by the so-called pivoting.

The present method aims at keeping the part of the parity check matrix H to which the Gaussian elimination is applied as small as possible since this method requires a high computing power for large matrixes because of the necessary summing of lines. The complexity of the maximum likelihood process is $O(n^3)$, where n is the block length, i.e. the number of columns of the parity check matrix H. If the Gaussian elimination is performed only on a small part of the parity check matrix H, the required computational power can be reduced significantly. This is achieved by incrementally enlarging the sub-matrix A, as illustrated in FIG. 2. By consciously selecting the column or the columns of the sub-matrix B that are to be shifted into the sub-matrix P, it becomes possible to give the sub-matrix A a triangular form, such as the lower triangular form, for instance, and to simultaneously keep the sub-matrix P as small as possible so that the computational effort for the Gaussian elimination applied to the sub-matrix P can be minimized. For instance, through well-aimed column selection, the column size of the sub-matrix P can be reduced to one half or one third, e.g. from 90 to approximately 30-40, which will have a positive effect on the working speed of the decoder.

Before the Gaussian elimination is applied to the sub-matrix P, the sub-matrix A is given a diagonal form and the sub-matrix D is zeored out. Thus, the Gaussian elimination has to be applied only to the lower part of the sub-matrix P, that is to P1. P1 is dense. When the Gaussian elimination of P1 has been successfully terminated, the other unknowns can be determined iteratively or by back substitution. In this context, the iterative method is preferred. The same is applied to the original matrix by using the unknowns now determined.

One possible way of consciously selecting the respective columns of the sub-matrix B that are to be shifted into the sub-matrix P, is to select the column having the greatest weight. With a plurality of columns having the same weight, a column to be shifted into the sub-matrix P is selected at random.

As an alternative, it is possible to shift the column or those columns of the sub-matrix B into the sub-matrix P that are connected to the line having the lowest weight. With a plurality of lines having the same lowest weight, the line with the greatest cumulative column weight is selected and the connected columns of the sub-matrix B are shifted into the sub-matrix P. The cumulative column weight of a line is defined as the sum of the weights of all columns connected to that line. In this context, the column that is not shifted into the sub-matrix P can be selected optionally. With a plurality of columns having the same lowest weight, and the same cumulative column weight, a line may be chosen at random and the columns connected thereto can be shifted into the sub-matrix P, except for one.

Moreover, it is alternatively possible to shift that column of the sub-matrix B into the sub-matrix P that is connected to the largest number of lines having a weight of two. With a plurality of columns connected to an equal number of lines having a weight of two, a column may be selected at random. Should the search for columns connected to lines having a weight of two yield that there are no such columns, the column of the sub-matrix B having the greatest weight is shifted into the sub-matrix P, where, in the event of a plurality of columns of the same weight, a column is selected at random for shifting into the sub-matrix P.

In a further algorithm it is possible to establish a Tanner graph for the variable nodes of the sub-matrix B each time a column of the sub-matrix B hinders the triangularization process. In a first step in a Tanner graph, all variable nodes send their degree to all the check nodes connected therewith. The degree of a variable node corresponds to the number of check nodes connected therewith. In another step, each check node selects the lowest degree from the degrees transmitted and sends the same to all variable nodes connected with that check node. Here, the degree of the respective variable node to which the transmission is directed, is ignored in the respective selection of the lowest degree so that the own degree of a variable node is never transmitted back to that node. This means that the variable node having the lowest degree is never supplied with its own degree but with the degree of another variable node having the same degree or with the second lowest degree of another variable node.

In another step, each variable node sums up the minimal degrees received from the check nodes connected with the respective variable node and its own degree and sends the sum to all check nodes it is connected with. Here, the minimal, i.e. the lowest degree received by a specific check node is ignored when calculating the sum of the minimal degrees that is to be sent back to this specific check node. Thus, each check node receives a sum from every variable node connected therewith which does not include the minimal degree transmitted from this check node to the respective variable node.

The method steps described hereinbefore are repeated n times. For instance, 10 repetitions are possible. Subsequently, the variable node with the largest sum of minimal degrees and its own degree is determined as a column to be shifted from the sub-matrix B into the sub-matrix P.

Another alternative method also provides for establishing a Tanner graph for the remaining variable nodes of the sub-matrix B, if a column of the sub-matrix B hinders the triangularization process. Thereafter, the following steps will be performed:

First, variable nodes are searched that are directly connected via check nodes having a degree of two. These variable nodes and the connected check nodes with a degree of two are comprised into a so-called super variable node. At this point, check nodes can be identified that have more than one link to a super variable node. This means that such a check node has a plurality of connections to several variable nodes of this super variable node. Since a super variable node is defined by the fact that all variable nodes are known as soon as one variable node of this super variable node is known, the multiple connections of such a check node to the super variable node can be ignored except for one. Thereby, the degree of this check node can be reduced. Provided that, besides the connections to the super variable node, only one further connection exists from this check node to another variable node, there will be generated a check node having a degree of two.

Thus, it is possible to create further check nodes with a degree of two so that further variable nodes or super variable nodes are possibly formed that are directly interconnected via check nodes having a degree of two. Together with the connected check nodes of a degree of two, the same can be comprised into an enlarged super variable node, but only if comprising at least one key node. The method steps are repeated until no further enlargement of the super variable node is possible. Hereunder, the terms "enlarged SVN" and "SVN" are considered as equivalents.

Eventually, the variable node or super variable node with the highest degree is determined. If this node is a super variable node, that column which corresponds to the key node of the super variable node will be shifted from the sub-matrix B into the sub-matrix P. If this node of the highest degree is a simple variable node, the corresponding column will be shifted from the sub-matrix B into the sub-matrix P.

The degree of a super variable node is defined as the number of the outgoing connections to check nodes outside this super variable node.

It is a prerequisite of the above mentioned method that a so-called key node has to exist for each super variable node, a key node being a variable node that is part of the super variable node and which, if it is known, allows to solve the super variable node. Thus, if this key node is known, e.g. from a later following Gaussian elimination step applied to P1, all other variable nodes of the respective super variable node can be restored with the aid of an iterative decoding step.

After one or a plurality of columns selected by the methods described above have been shifted from he sub-matrix B into the sub-matrix P, the triangularization process can be continued until the triangularization process is hindered again by a column so that one or a plurality of columns have to be shifted from the sub-matrix B into the sub-matrix P again.

The triangularization process is characterized in that the only entry having a value of one in a line having a weight of one of the sub-matrix B is shifted to the top left corner of the sub-matrix B by exchanging lines and/or columns, whereupon the sub-matrix A of the matrix H, which is already triangular in form, is enlarged by one column and one line so that the sub-matrix B is reduced by the same line and the same column. Thereby, the matrix is given the lower triangular form.

The following is an explanation of the basic functioning of the hybrid decoder, i.e. the combination of an iterative decoder in a first decoding step and a maximum likelihood decoder in a second decoding step.

According to the invention, in a first decoding step, use is made of an iterative decoder. In a second decoding step, use is made of a maximum-likelihood decoder; particularly, the second decoding step is performed exclusively when the data cannot be sufficiently recovered by the iterative decoder.

In other words, the method will start with the first decoding step performed by the iterative decoder. In case of successful recovery of the lost and/or corrupted data by means of the iterative decoder, the recovered data is delivered. In case where a recovery of the data by means of the iterative decoder does not fully succeed but is unconditionally desired, there is initiated the second decoding step which is performed by the maximum-likelihood decoder. This makes it possible to reduce the number of times that the maximum-likelihood decoder is used. Considering, for instance, the performance developments according to FIG. 9 which are known from the state of the art, and further assuming a channel-erasure rate $\epsilon$ of 0.4, it is evident that the iterative decoder will in 20% of the cases not be capable to recover the lost and/or corrupted data. Consequently, in the illustrated example, the maximum-likelihood decoder would be used in only 20% of the cases. Since the iterative decoder is used in the other 98% of the cases and since this decoder is faster and simpler in operation, the method of the invention accomplishes a considerable simplification in the recovery of lost and/or corrupted data. Particularly, the method is applicable also in receiver devices which include a processor with lower performance capabilities, which e.g. is not suited for a continuous operation in the Maximum-Likelihood Method. According to the state of the art, such a processor would presently only allow the use of the iterative decoding method, which would result in a deterioration of the recovery rate. By the method of the invention, a high recovery rate can be obtained also with less-performing processors. Thus, according to the invention, the proposed method makes it possible to reach the performance of a maximum-likelihood decoder by use of less complex means.

Both the encoder, which is connected to the transmitter device, and the decoder, which is connected to the receiver device, can be realized in hardware or software. Particularly, the encoder and/or the decoder can be realized as software which is implemented in the transmitter device and/or the receiver device.

Preferably, the coding and decoding of the data is carried out on the packet level, i.e. in the network layer of the OSI layer model.

To reduce the computing power required for the maximum-likelihood decoder in the second decoding step, an LDPC matrix is used in the decoder. This will on the one hand lead to a worse recovery rate but on the other hand allow for a faster and less computation-intensive decoding method. Those data packets which could be recovered neither by the iterative decoder nor by the maximum-likelihood decoder, are considered to have not been correctly transmitted so that renewed transmission of the data packets by the transmitter device can be initiated.

Preferably, for reducing the complexity of the maximum-likelihood decoder, an abortion parameter is defined, wherein the computations for recovery of lost and/or corrupted data by the maximum-likelihood decoder are aborted if the value $\alpha$ in the structured Gaussian elimination performed by the maximum-likelihood decoder exceeds the amount of the selected abortion parameter. The abortion parameter preferably defines an upper bound for the size of the used matrix on which Gaussian elimination is applied.

In principle, a maximum-likelihood decoder for use with Low Density Parity Check Codes can be based on smart efficient Gaussian elimination methods in the binary field, as described e.g. in D. Burshtein and G. Miller, "An efficient maximum likelihood decoding of LDPC codes over the binary erasure channel", IEEE Transactions on Information Theory, Volume 50, no. II, pp. 2837-2844, November 2004, or E. Paoloni, G. Liva, M. Balazs and M. Chiani, "Generalized IRA Erasure Correcting Codes for Maximum Likelihood Decoding", submitted to IEEE Communication Letters 2008. Preferably, the so-called structured Gaussian elimination is used. Further details for the definition of the abortion parameter will be rendered in the passages dealing with FIG. 3 within the description of figures of the present application.

Preferably, the computations for recovery of lost and/or corrupted data by the maximum-likelihood decoder are aborted if the value alpha in the structured Gaussian elimination performed by the maximum-likelihood decoder exceeds the selected abortion parameter. Also the value a in the structured Gaussian elimination will be described in greater detail in said passages dealing with FIG. 3 of the present application.

The amount of the abortion parameter can be selected by the user of the receiver device on the basis of the available computing power of the receiver device, the current operational burden imposed on a processor of the receiver device, the desired quality of service and/or the available capacity of an energy store of the receiver device. Thus, for instance, it is possible to improve the quality of the recovery rate by increasing the abortion parameter. Thereby, the quality of service can be improved. If, by contrast, the abortion parameter is decreased, it is rendered possible e.g. to reduce the operational burden of a processor of the receiver device or the power consumption of the receiver device.

Thus, by the definition of the abortion parameter, there is created an additional degree of freedom which makes it possible to adapt the decoder of the receiver device to existing marginal conditions and thus make it more user-friendly and/or reliable.

Preferably, upon abortion of the computation for recovery of lost and/or corrupted data by the maximum-likelihood decoder, all that is performed is the delivery of the correctly transmitted and/or recovered data by the decoder. Further, an error message can be generated by the decoder. An error message primarily means that the non-recovered data and data packets are reported as missing so that a new transmission will be initiated.

A further, independent invention relates to the use of a method, particularly as described in the present application, for wireless or wire-bound transmission of data between a transmitter device and a receiver device.

Preferred embodiments of the invention will be described in greater detail hereunder with reference to the accompanying drawings.

BRIEF DESCRIPTION OF THE DRAWINGS

FIG. 1 is a flow diagram of the data transmission between a transmitter device and a receiver device as practicable also in the method of the invention;

FIG. 2 shows the parity check matrix H during the triangulation process (left-hand side) and after pivoting (right-hand side);

DETAILED DESCRIPTION OF THE PREFERRED EMBODIMENT

From FIG. 2, as already described, it is evident in which manner the sub-matrix A has to be enlarged by shifting columns of the sub-matrix B into the sub-matrix P. The right-hand side of FIG. 2 represents the matrix H after the sub-matrix D has been zeroed out so that the Gaussian elimination method has to be applied only to the sub-matrix P1.

Figure 3:
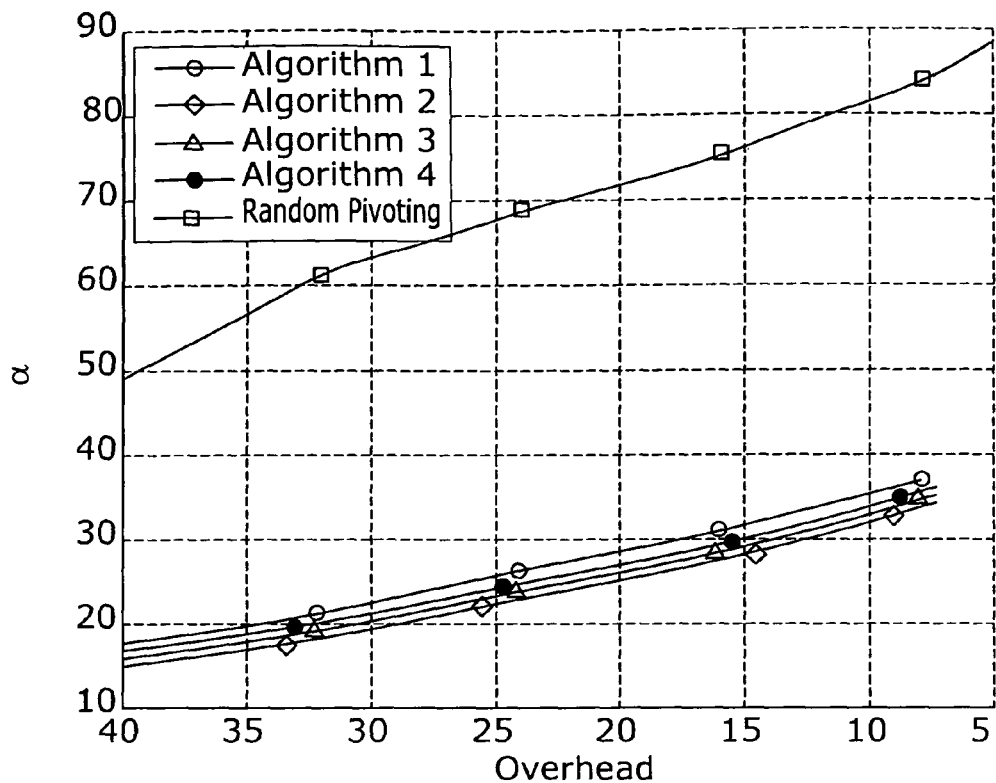
FIGS. 3 and 4 show the pivot size a representing the block length of the sub-matrix P in dependence on various overheads.
Figure 4:
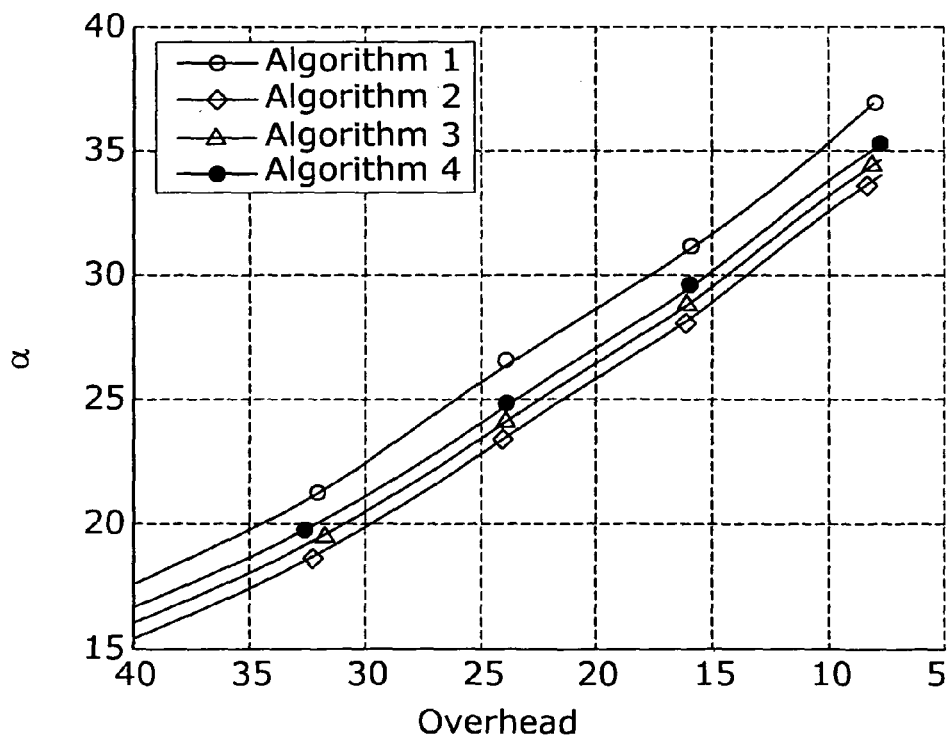

FIGS. 3 and 4 show the pivoting value α, namely the block length of the sub-matrix P, i.e. the number of columns which have been displaced, in dependence on the overhead. The overhead herein is dependent on the channel erasure rate. The average pivot size a was simulated for various overheads in one hundred different tests. Herein, there was used an Irregular Repeat Accumulate (IRA) (2048, 1024) Code. In the best case, such a code can tolerate 1024 erasures. Thus, the overhead can be expressed as: Overhead=1024−actual number of erasures in the codeword.

The simulation results for the first four inventive algorithms are visualized in FIG. 3 wherein the upper curve represents a method wherein columns have been shifted into the sub-matrix P at random, i.e. in a coincidental manner. In FIG. 4, for reasons of clarity, the first four inventive algorithms are represented a second time on a different scale. For all algorithms, it can be seen that α decreases with increasing overhead. Partially, this is the case since $$H\frac{T}{K},$$

namely the matrix which is passed over to the ML decoder, is decreasing because numerous equations have already been solved. What is more important, however, is the fact that the triangularization process will not be impeded that frequently anymore because the row weights in the sub-matrix B will decrease with increasing overheads.

When comparing the four different algorithms in FIG. 4, it is observed that they reach a similar performance. For fast applications, algorithm 1 is best suited because of its simplicity. To obtain a smallest possible α, it is proposed to use algorithm 4. For all of these algorithms, a large difference from the method according to the state of the art (Random Pivoting according to FIG. 3) is evident. In this context, it is to be noted that the complexity of the Gaussian elimination method will cubically increase along with the block length α.

The fourth inventive algorithm can be mathematically represented as follows: Each variable node will transmit a message to the connected check nodes, said message being computed as:

$$m_{I \to J} = \sum_{j=1, j \neq J}^{M'} m_{I \leftarrow j} + \deg(VNi),$$

with $m_{I \to J}$ describing the message transmitted by a specific variable node I to the check node J. $m_{I \leftarrow j}$ is the message from a random check node j to the variable node I, and M' is the number of all unsolved check nodes in the sub-matrix B. In summary, the message of a variable node I to a check node J is composed of the degree of the variable node and the sum of all incoming messages ($m_{i \leftarrow j}$) except for the message from check node J. At the start, all incoming messages=0.

Each check node will transmit messages to the connected variable nodes according to:

$$m_{I \leftarrow J} = \min_{i \neq I} m_{i \to J, i \in 1, \ldots, N'}$$

Herein, $m_{I \leftarrow J}$ represents the message from check node J to the variable node I, and N' represents the number of unsolved variable nodes in the sub-matrix B. $m_{i \to J}$ represents the message from a random variable node i to the check node J. Finally, check node J will transmit only the message with the smallest value to the variable node I, while no consideration is given to the message received from the variable node I. For each variable node, there will then be computed a value composed of the sum of all messages and the degree of this node, and the variable node having the highest value will be added to the list of pivots, namely the sub-matrix P. It is to be noted that a larger number of iterations will lead to better results but will also require more time. For the simulation illustrated in FIGS. 3 and 4, ten iterations were performed.

Hereunder, the fifth algorithm of the invention will be again briefly explained.

Before describing the pivoting strategy in detail, some definitions should be introduced. In the following we will no longer consider rows and columns but we will rely on the graph representation of the code. Here each row corresponds to a check node (CN) and each column to a variable node (VN). A CN(i) is connected to a VN(j) and vice versa if the corresponding entry H(i,j) in the parity check matrix of the code is one. The degree of a CN (VN) is the number of connected VNs (CNs) and hence corresponds to the row (column) weights introduced previously. A Super Variable Node (SVN) is a variable node that consists of several check nodes and variable nodes. It is constructed in a way that if any single arbitrary VN in the SVN is known all other VNs in the SVN can be recovered just by means of iterative decoding. Super variable nodes can be generated as follows:

(Note that the all operations refer to the matrix B)

Pick a degree two check node that is not part of a SVN; if none exists, no SVN can be generated and the algorithm is finished.

Merge the selected degree two check node and both connected VNs to an entity called SVN. In the bipartite graph the SVN has the role of a (high degree) VN (cf. bottom of FIG. 5). It is to be observed that each SVN must have at least one key node.

If further degree two check nodes are connected to the SVN, add them and the connected VNs or SVNs to the SVN. It is to be observed that each SVN must have at least one key node.

If existing, ignore all multiple connections but one between the SVN and the connected CNs and decrease the degree of the affected CNs by the number of eliminated connections.

Repeat step 3 and 4 (this is the so-called growth phase) until no further connections are possible anymore.

Go back to step 1 again in order to identify further SVNs.

The algorithm presented above has been tested using different LDPC codes. Usually, after the first iterative decoding step there are many unsolved degree two equations left, so that several SVNs can be generated. Since the knowledge of one VN in a SVN is sufficient to recover all other VNs within that super node it makes sense to consider them as one entity. Another peculiarity of the considered LDPC codes are the loops in the graph of the code, also referred to as girth. This is the reason why multiple connections between a CN and a SVN appear. Removing them might generate additional degree two equations so that the SVN can grow further. By ignoring multiple connections, not only equations of original degree two, but also higher degree equations will participate in the generation of an SVN. Of course, the number of SVNs and the size, i.e. the number of VNs inside, depends clearly on the code design.

Figure 5:
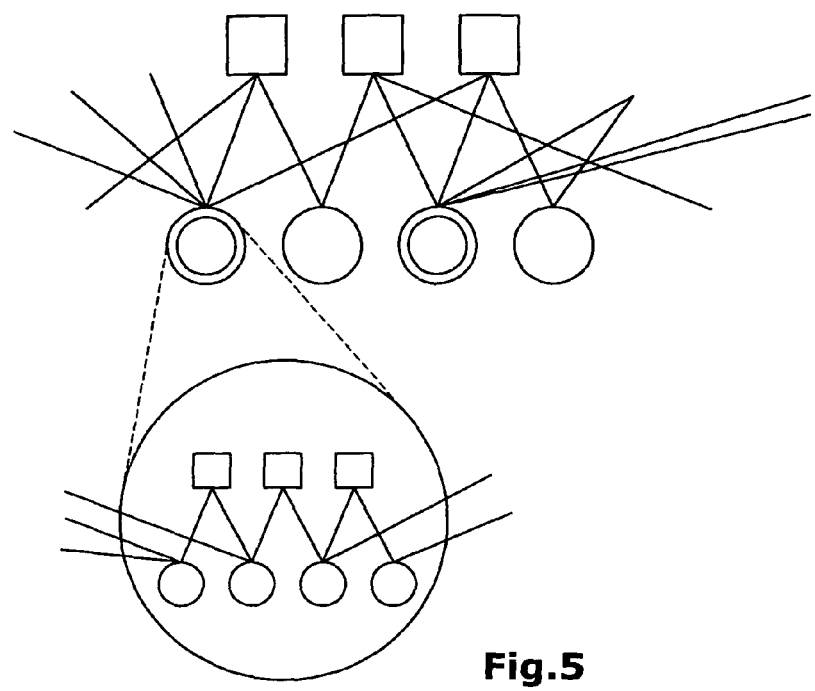
FIG. 5 is a representation of the super variable nodes of the fifth algorithm according to the invention.

FIG. 5 demonstrates the simplified graph structure of an LDPC code including SVNs. Check nodes are represented by boxes, variable nodes by circles and super variable nodes are represented by concentric circles. It is obvious that SVNs usually have high degrees since they are composed of several VNs. Note that the degree of a SVN is determined by the number of outgoing connections, i.e. connections to CNs that are not member of the SVN. All connections to CNs within the super nodes are not taken into account when computing the degree. An insight in the inner structure of a SVN is given in the lower part of FIG. 3. After generating the SVNs, the aim is to apply a pivoting strategy on this simplified graph.

In case triangularization cannot continue, eliminate the SVN or VN with the highest degree. When eliminating an SVN, there will always be removed only the column belonging to the key node. Apart from this, no further difference is made between SVNs and VNs here. The former one simply corresponds to a (high) degree VN. As a consequence what matters is only the degree of the node and not the type (VN or SVN).

In case of several nodes (SVNs, VNs) with the same degree, pick one randomly.

Figure 6:
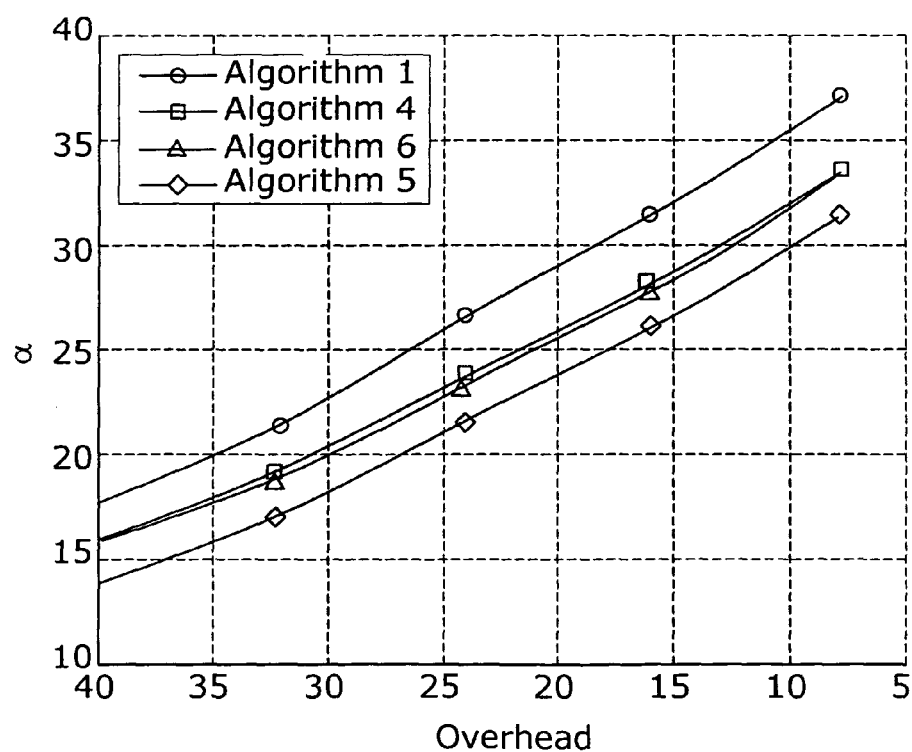
FIG. 6 is a representation of the pivot size a representing the block length of the sub-matrix P in dependence on the overhead for the fifth algorithm according to the invention.

FIG. 6 illustrates the size of the block length α in dependence on various overheads. Illustrated are the inventive algorithms 1 and 4 as well as the inventive algorithm 5 described above. Algorithm 6 illustrated herein is an algorithm known from the state of the art.

Figure 7:
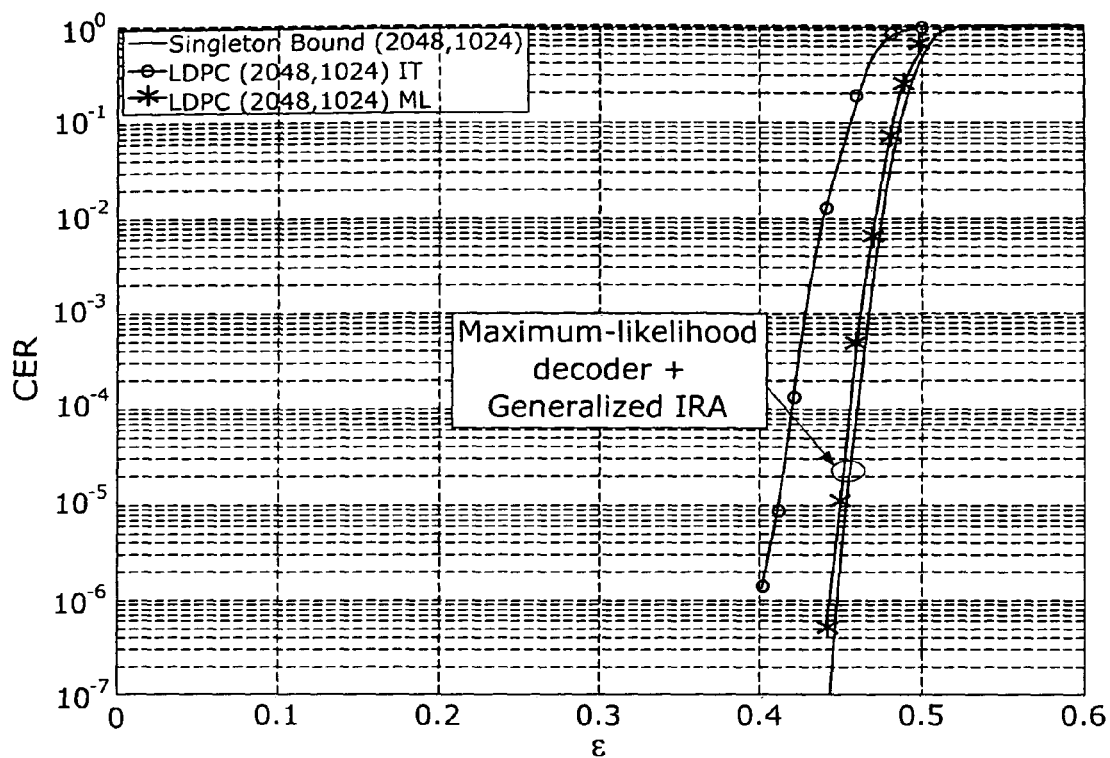
FIG. 7 shows the code error rate (CER) in dependence on the channel erasure rate E with the first of the algorithms according to the invention.
Figure 8:
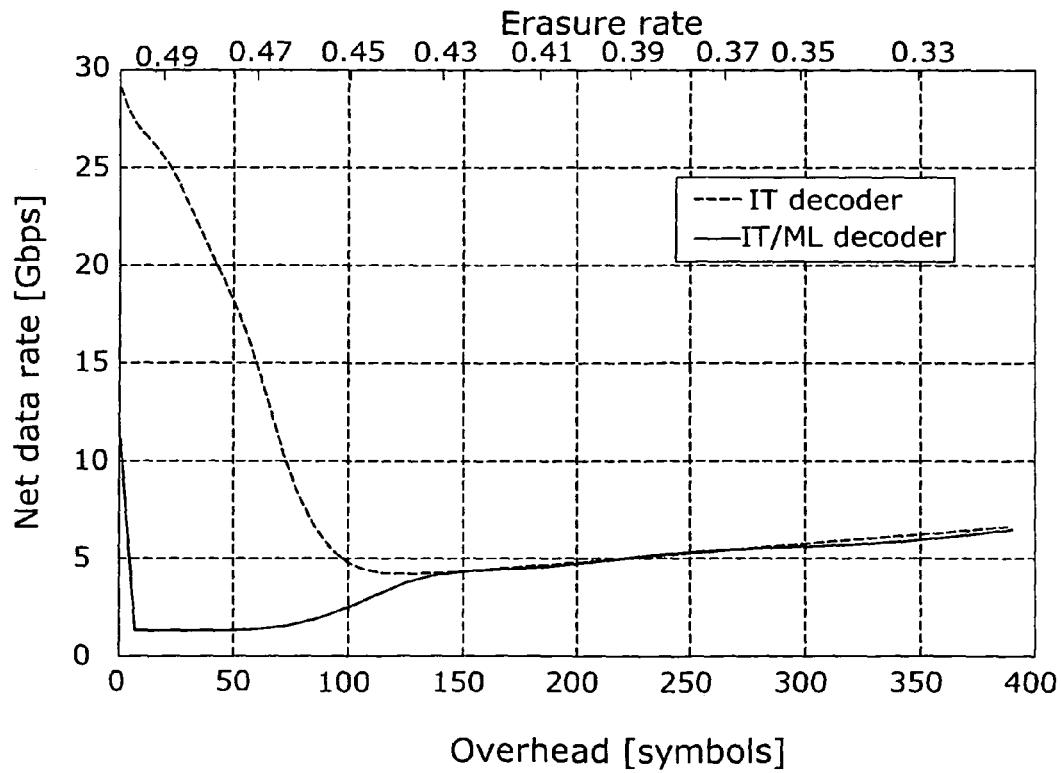
FIG. 8 is a representation of the speed to be reached by the first of the algorithms according to the invention.
Figure 9:
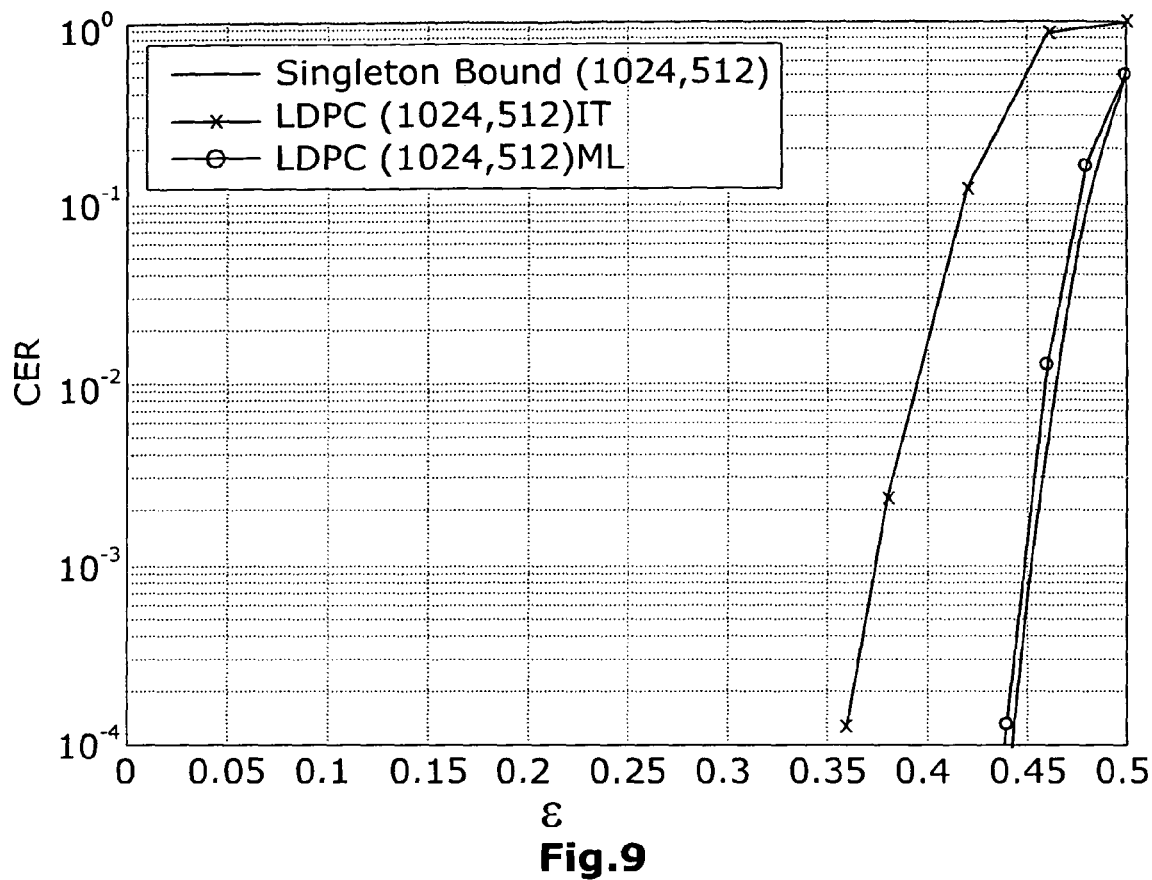
FIG. 9 is a graphical representation of the Codeword Error Rate in dependence on the Channel Erasure Rare according to the state of the art.

FIG. 7 shows the Codeword Error Rate of a Maximum Likelihood Decoder in which one of the inventive algorithms has been implemented, in comparison to an iterative decoder. As evident, it is reasonable to use the maximum likelihood decoder if ε is between 0.4 and a value some-what below 0.5. In case of values smaller than 0.4, the iterative decoder can be used. The speeds which can be obtained herein are illustrated in FIG. 8 where it can be seen that the iterative decoder will reach very high speeds for values ε above 0.43, which is the case because the iterative decoder cannot restore a large part of the data. In FIG. 8, it can be seen that, for values ε below 0.43, it is also in the hybrid decoder that only the iterative decoder will be used since the latter can restore the lost data in nearly all cases. The maximum likelihood decoder will be used virtually exclusively in case of larger channel erasure rates.

Figure 10:
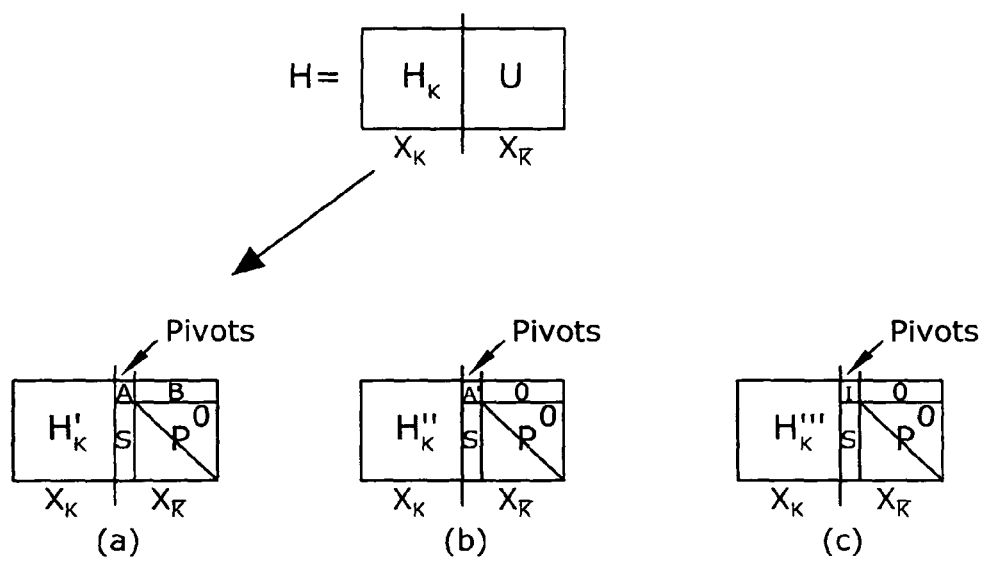
FIGS. 10*a*-10*c* indicate the computations for structured Gaussian elimination.

FIG. 10 schematically shows the principal procedure of the Gaussian elimination. U represents a sub-matrix of H and is formed by the columns of H located at the positions corresponding to lost and/or corrupted data packets. For easier explanation, FIG. 10 is presented under the assumption that all of the erased packets are adjacent to each other, i.e. contiguous, and are arranged at the end of the packet-level codeword. For solving this system of equations, U has to be brought into the diagonal form. This is possible under the condition that U comprises the largest possible number of independent rows and columns, i.e. that rank U is equal to the number of erased packets (full rank criterion).

The structured Gaussian elimination is performed in the following manner: First, U is brought into an approximately triangular form. This is effected by simple permutations of the rows/columns (FIG. 10a). In a second step, the matrix B in FIG. 10a is zeroed-out by row sums, thus generating a structure as shown in FIG. 10b. The above-mentioned first two steps will result in a complexity that is $O(u^2)$, where u represents the size of the erased bit patterns.

In a third step, "brute-force Gaussian elimination" is applied to the matrix A' in FIG. 10b. This will lead to an identity matrix I. The third step has a complexity that is $O(alpha^3)$, where alpha represents the number of columns of the matrix A'.

It is evident that the equation system represented by the matrix on the right-hand side in FIG. 10c can be solved by back substitution. The described method is applicable exclusively if U fulfils the "full rank" criterion.

Already for medium block lengths, the complexity of a decoder of the above type is dominated by the amount of alpha. The complexity of the iterative decoder is linear, however at the penalty of a reduced decoder performance.

Since, in many applications, such as audio- and video-streaming, the processor performance in mobile end devices is insufficient for a permanent maximum-likelihood decoding, the inventive method is useful to perform an improved data transmission to the above devices in spite of said insufficiency. Apart from the use of the iterative decoder in the first decoding step and the use of the maximum-likelihood decoder in the second decoding step if the first decoding step has not been successful, further possibilities for adaptation are offered by varying the parameter a. This parameter preferably defines the upper bound of the size of matrix A'. The complexity of the illustrated maximum-likelihood algorithm will be dictated by alpha, i.e. the number of columns of the matrix A'. Alpha primarily depends on the channel-erasure rate $\epsilon$, i.e. the higher the probability of erasure of data on a channel is, the higher the value of alpha will be. In case of low probabilities of a channel erasure, alpha can assume the value zero.

The adapting of the complexity of the maximum-likelihood decoder is performed in that each occurrence where—after U has been brought into the triangular form according to FIG. 10a—alpha exceeds the value of the parameter a, will cause the decoder to output an error message and deliver exclusively the correctly transmitted and/or recovered data packets. Already by the use of an iterative decoder and the subsequent use of a maximum-likelihood decoder in case that a restoration of data by the iterative decoder should fail, it is accomplished to reach the performance of a maximum-likelihood decoder while nonetheless requiring a lesser degree of complexity. By the subsequent adaptation of the parameter a, the complexity of the decoder can be reduced even further, which is made possible by defining an upper limit for the size of the matrix subjected to the Gaussian elimination. Thereby, the maximum-likelihood decoder will be stopped already at an early point of time. The above step, i.e. the adapting of the parameter a, is effective to cause a shifting of the performance of the decoder. The larger a is, the closer the complexity and the performance of the decoder will come to the Maximum-Likelihood method. The smaller a is, the closer the complexity and the performance of the decoder will come to the iterative method.

Figure 11:
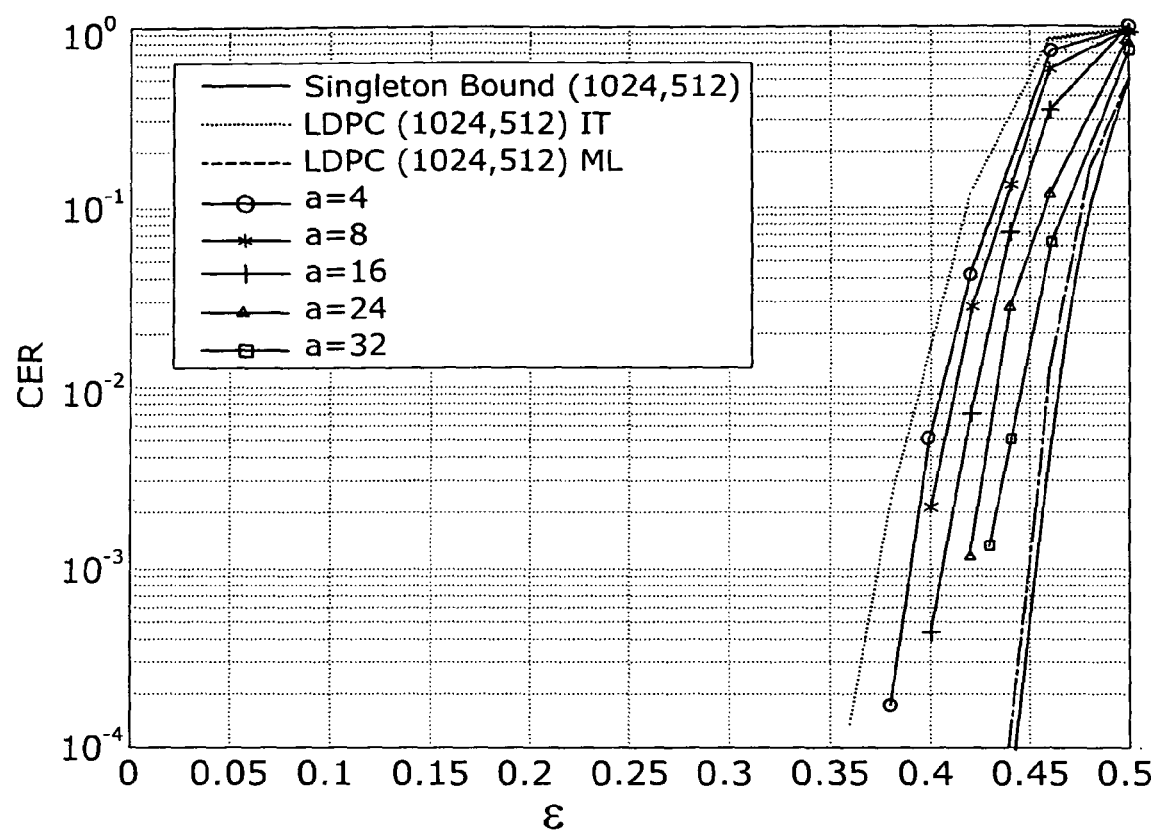
FIG. 11 is a graphical representation of the Codeword Error Rate in dependence on the Channel Erasure Rate with various abortion parameters a according to a possible embodiment of the invention.

Shown in FIG. 11 is the codeword error rate in dependence on $\epsilon$ for various values of the parameter a. Thus values used are a=0 (corresponding to using the iterative decoder exclusively), a=4, a=8, a=16, a=24, a=32 and a=$\infty$ (corresponding to using only the maximum-likelihood decoder without restrictions). In this manner, a smoother transition in performance can be reached between exclusive use of an iterative decoder and exclusive use of a maximum-likelihood decoder. For instance, the complexity of an application of the Gaussian elimination to an 8×8 matrix is $8:4^3=2^3=8$ times larger than the complexity of an application of the Gaussian elimination to a 4×4 matrix.

Figure 12:
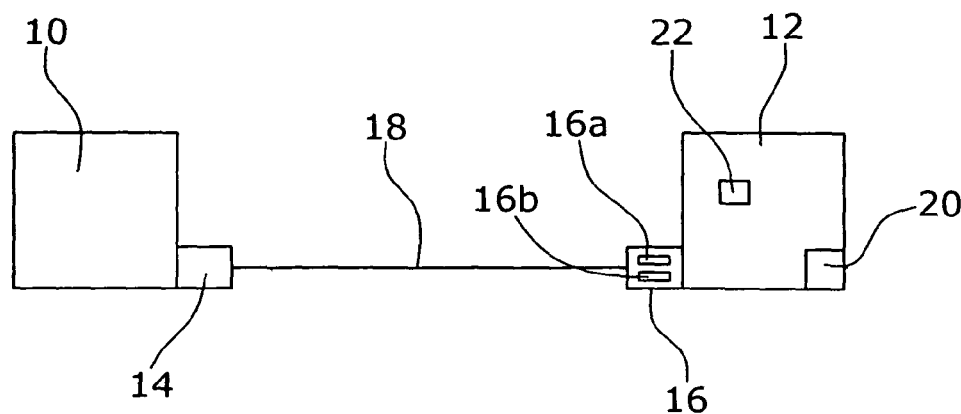
FIG. 12 is a schematic representation of a transmitter and receiver device for performing the inventive method.
Figure 13:
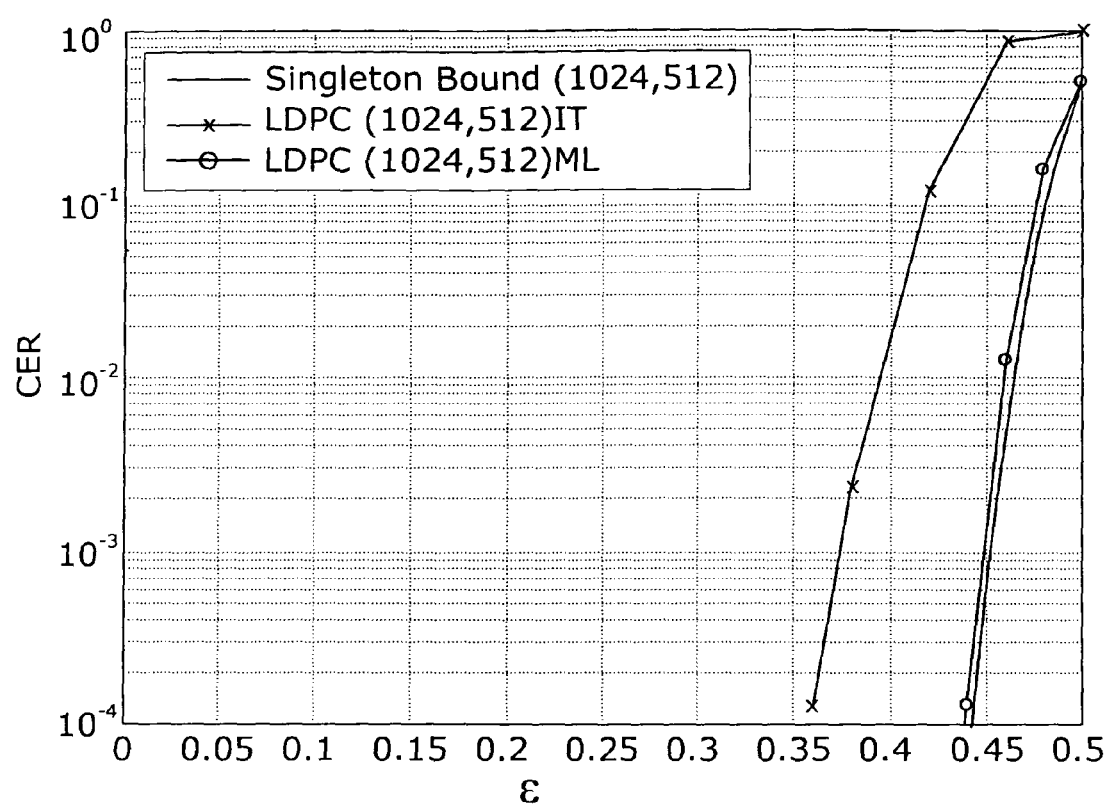
FIG. 13 shows a comparison between the performance of an iterative decoder and an ML decoder.

FIG. 12 schematically depicts a transmitter device 10 and a receiver device 12 wherein, via the transmission system 18 which is e.g. a UMTS connection, data is transmitted from the transmitter device 10 to the receiver device 12. On the transmitting side, the data is encoded by the encoder 14 connected to transmitter device 10. On the receiving side, the data is decoded by the decoder connected to receiver device 12. In the process, use is made of the low density parity check method so that lost and/or corrupted data will be recovered during decoding. A first decoding step is performed by use of the iterative decoder 16a. In case that an attempt at recovery of the data by the iterative decoder 16a is not successful, the maximum-likelihood decoder 16b will be used in a second decoding step. The receiver device may comprise a processor 22 and/or an energy store 20 such as e.g. a storage battery, and may be configured as a mobile receiver device 12.

What is claimed is:

1. A method for recovery of lost and/or corrupted data transmitted from a transmitter device to a receiver device, said method comprising the steps of:
    coding said data by means of an encoder connected to the transmitter device,
    transmitting said data from the transmitter device to the receiver device via a transmission system, and
    decoding said data, through application of a Low Density Parity Check method, by means of a decoder connected to the receiver device, wherein lost and/or corrupted data is restored during decoding,
    said decoding being performed by solving the equation system of the parity check matrix H,
    the parity check matrix H being brought into a triangular form by column and/or row permutations, and columns of a sub-matrix B of the matrix H which impede the triangulation process are shifted into a sub-matrix P of the matrix H so that the triangulation process can be continued until the matrix H except for the sub-matrix P has been completely brought into a triangular form, the Gaussian elimination method being applied to a part P1 of the sub-matrix P,
    wherein
    the selection of the column or columns of the sub-matrix B which are to be shifted into the sub-matrix P is performed on the basis of the weight of the column which corresponds to the number of non-zero-entries in the column, and/or on the basis of the weight of the rows of the sub-matrix B connected to the column.

2. The method according to claim 1, wherein a column j is connected to a row i of the matrix H if the i-th entry of said column j is 1.

3. The method according to claim 1, wherein that column of the sub-matrix B which has the highest weight is shifted into the sub-matrix P.

4. The method according to claim 3, wherein, in case of a plurality of columns with equal weight, a column is selected at random for being shifted into the sub-matrix P.

5. The method according to claim 1, wherein that column or those columns of the sub-matrix B which are connected to the row having the lowest weight, are shifted into the sub-matrix P.

6. The method according to claim 5, wherein, in case of a plurality of rows having the same lowest weight, the row having the highest cumulative column weight is selected and the columns of the sub-matrix B which are connected to said row are shifted into the sub-matrix P except for one column, the cumulative column weight of a row being defined as the sum of all weights of all columns connected to said row.

7. The method according to claim 6, wherein that column which is not shifted into the sub-matrix P is selected at random.

8. The method according to claim 5, wherein, in case of a plurality of rows having the same lowest weight and the same cumulative column weight, one row is selected at random and the columns connected thereto are shifted into the sub-matrix P except for one column.

9. The method according to claim 5, wherein, in case of a plurality of columns which are connected to the same number of rows having a weight of two, one column is selected at random and is shifted into the sub-matrix P.

10. The method according to claim 1, wherein that column of the sub-matrix B which is connected to the largest number of rows having a weight of two, is shifted into the sub-matrix P.

11. The method according to claim 10, wherein, if the examination for columns connected to rows having a weight of two, has the result that no such columns exist, that column of the sub-matrix B which has the highest weight is shifted into the sub-matrix P, and wherein, in case of a plurality of columns of equal weight, a column is selected at random for being shifted into the sub-matrix P.

12. The method according to claim 1, wherein, after shifting of one or a plurality of columns from the sub-matrix B into the sub-matrix P, the triangulation process is continued until a column again impedes the tri-angulation process so that, again, one or a plurality of columns are shifted from the sub-matrix B into the sub-matrix P.

13. The method according to claim 1, wherein, in the tri-angulation process, the sole entry of a value of one of a row of a weight of one of the sub-matrix B is shifted, by row and/or column permutations, into the left upper corner of the sub-matrix B and, thereafter, a sub-matrix A of the matrix H which is already in a triangular form, is enlarged by one column and one row so that the sub-matrix B is reduced by the same column and row.

14. The method according to claim 1, wherein the matrix H is brought into the lower triangular form.

15. A method for recovery of lost and/or corrupted data transmitted from a transmitter device to a receiver device, said method comprising the steps of:

coding said data by means of an encoder connected to the transmitter device, transmitting said data from the transmitter device to the receiver device via a transmission system, and decoding said data, through application of a Low Density Parity Check method, by means of a decoder connected to the receiver device, wherein lost and/or corrupted data is restored during decoding, said decoding being performed by solving the equation system of the parity check matrix H, the parity check matrix H being brought into a triangular form by column and/or row permutations, and columns of a sub-matrix B of the matrix H which impede the triangulation process are shifted into a sub-matrix P of the matrix H so that the triangulation process can be continued until the matrix H except for the sub-matrix P has been completely brought into a triangular form, the Gaussian elimination method being applied to a part P1 of the sub-matrix P, wherein each time when a column of the sub-matrix B impedes the triangulation process, a Tanner graph is generated for the remaining variable nodes of the sub-matrix B, where a) in said Tanner graph, all variable nodes communicate their degree, namely the number of the check nodes connected to them, to all check nodes connected to them;

b) each check node selects from the degrees communicated to it the lowest degree and transmits said degree to all variable nodes connected to it, and the degree of the respective variable node to which said transmission is made is left unconsidered in the respective selection of the lowest degree so that a variable node will never have its own degree transmitted back to it, c) each variable node is operative to add up the minimal degrees received from the check nodes connected to the respective variable node, and its own degree, and to transmit this sum to all check nodes connected to it, wherein the minimal degree which was received from a specific check node is left unconsidered in the generation of the sum of the minimal degrees which is to be transmitted back to this check node, wherein the process steps a) to c) are repeated n times and that variable node which has the largest sum of minimal degrees and of its own degree is determined as the column to be shifted from the sub-matrix B into the submarix P.

16. A method for recovery of lost and/or corrupted data transmitted from a transmitter device to a receiver device, said method comprising the steps of:

coding said data by means of an encoder connected to the transmitter device, transmitting said data from the transmitter device to the receiver device via a transmission system, and decoding said data, through application of a Low Density Parity Check method, by means of a decoder connected to the receiver device, wherein lost and/or corrupted data is restored during decoding, said decoding being performed by solving the equation system of the parity check matrix H, the parity check matrix H being brought into a triangular form by column and/or row permutations, and columns of a sub-matrix B of the matrix H which impede the triangulation process are shifted into a sub-matrix P of the matrix H so that the triangulation process can be continued until the matrix H except for the sub-matrix P has been completely brought into a triangular form, the Gaussian elimination method being applied to a part P1 of the sub-matrix P, wherein each time when a column of the sub-matrix B impedes the triangulation process, a Tanner graph is generated for the remaining variable nodes of the sub-matrix B, said method comprising the following additional steps:

a) searching for variable nodes which are directly connected to each other by check nodes of a degree of two;
b) combining these variable nodes and the check nodes of a degree of two connected to them into a super variable node;
c) searching for check nodes comprising more than one connection to a super variable node, wherein, in such check nodes, the multiple connections to the super variable node are removed except for one so that the degree of this check node is reduced to two;
d) searching for variable nodes or super variable nodes which are directly connected to each other by check nodes of a degree of two;
e) combining these variable nodes and super variable nodes and the check nodes of a degree of two which are connected thereto into an enlarged super variable node;
f) repeating the steps c) to e) until no enlargement of the super variable node is possible anymore;
g) wherein that variable node or super variable node which has the highest degree is determined as the column to be shifted from the sub-matrix B into the sub-matrix P.

17. The method according to claim 16, wherein the degree of a super variable node is the number of outgoing connections to checks nodes outside this super variable node.

18. The method according to claim 16, wherein, for each super variable node, there must exist a key node, a key node being a variable node which is part of the super variable node and which, when it is known, allows for the solution of the super variable node.

* * * * *